(12) United States Patent
Mukherjee

(10) Patent No.: US 9,772,943 B1
(45) Date of Patent: Sep. 26, 2017

(54) MANAGING SYNONYMS IN VIRTUAL-ADDRESS CACHES

(71) Applicant: Cavium, Inc., San Jose, CA (US)

(72) Inventor: Shubhendu Sekhar Mukherjee, Southborough, MA (US)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 15/088,354

(22) Filed: Apr. 1, 2016

(51) Int. Cl.
| | |
|---|---|
| *G06F 12/08* | (2016.01) |
| *G06F 12/0811* | (2016.01) |
| *G06F 12/1045* | (2016.01) |
| *G06F 12/0864* | (2016.01) |
| *G06F 12/0846* | (2016.01) |
| *G06F 12/0871* | (2016.01) |
| *G06F 12/0855* | (2016.01) |

(52) U.S. Cl.
CPC ...... *G06F 12/0811* (2013.01); *G06F 12/0864* (2013.01); *G06F 12/1063* (2013.01); *G06F 12/0848* (2013.01); *G06F 12/0855* (2013.01); *G06F 12/0871* (2013.01); *G06F 2212/283* (2013.01); *G06F 2212/6032* (2013.04)

(58) Field of Classification Search
CPC ............. G06F 12/0811; G06F 12/0871; G06F 12/0855; G06F 12/0848
USPC ................................................. 711/122, 120
See application file for complete search history.

(56) References Cited

U.S. PATENT DOCUMENTS

| | | | | |
|---|---|---|---|---|
| 2003/0023814 | A1* | 1/2003 | Barroso | G06F 12/0826 711/122 |
| 2013/0185520 | A1* | 7/2013 | Dieffenderfer | G06F 12/1063 711/144 |
| 2015/0032964 | A1* | 1/2015 | Habermann | G06F 12/0811 711/122 |
| 2016/0188486 | A1* | 6/2016 | Sohi | G06F 3/061 711/118 |
| 2016/0224471 | A1* | 8/2016 | Avudaiyappan | G06F 12/1054 |

OTHER PUBLICATIONS

Qiu et al., "The Synonym Lookaside Buffer: A Solution to the Synonym Problem in Virtual Caches", IEEE Transactions on Computers, vol. 57(12): p. 1585-1599, 2008.
Cekleov et al., "Virtual-Address Caches—Part 1: Problems and Solutions in Uniprocessors", IEEE, p. 64-71, 1997.

(Continued)

*Primary Examiner* — Than Nguyen
(74) *Attorney, Agent, or Firm* — Occhiuti & Rohlicek LLP

(57) ABSTRACT

A virtual-address cache module receives at least a portion of a virtual address and in response indicates a hit or a miss. A first cache structure stores only memory blocks with virtual addresses that are members of a set of multiple synonym virtual addresses that have all been previously received by the virtual-address cache module during the operating period, where each member of a particular set of multiple synonym virtual addresses translates to a common physical address, and a memory block with the common physical address is stored in at most a single storage location within the first cache structure. A second cache structure stores only memory blocks with virtual addresses that do not have any synonym virtual addresses that have been previously received by the virtual-address cache during the operating period.

36 Claims, 3 Drawing Sheets

(56) References Cited

OTHER PUBLICATIONS

Basu et al., "Reducing Memory Reference Energy with Opportunistic Virtual Caching," ISCA '12 Proceedings of the 39$^{th}$ Annual International Symposium on Computer Architecture, Portland, Oregon, Jun. 9-13, 2012, IEEE Computer Society, 12 pages.
Yoon et al., "Revisiting Virtual L1 Caches: A Practical Design Using Dynamic Synonym Remapping," IEEE International Symposium, 2016, 13 pages.

* cited by examiner

MANAGING SYNONYMS IN VIRTUAL-ADDRESS CACHES

BACKGROUND

This description relates to managing synonyms in virtual-address caches.

Modern processors support 'virtual memory', which allows program instructions being executed by a CPU to refer to virtual addresses within a 'virtual address space' that is larger than a 'physical address space' that is defined by the size of main memory. Virtual memory involves address translation from one or more such virtual address spaces into a physical address space. The translation is performed using a 'page table' that stores mappings between virtual addresses and physical addresses at a granularity of memory pages (or simply 'pages').

Many modern processors also support hierarchical cache systems with multiple levels of cache, including one or more levels within the processor or within each core of a multi-core processor, starting with a level one (L1) cache, and one or more levels external to the processor or cores, up to a last level cache (LLC) that is accessed just before main memory is accessed. At each level of the hierarchy, the cache stores copies of a subset of data to speed access to that data by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data into entries and evict blocks of data from entries in units of 'memory blocks' (also called 'cache lines' or 'cache blocks'). Each memory block includes a number of 'words' of data, each word consisting of a predetermined number of bytes. A memory page typically has data from many memory blocks.

A cache that is accessed using at least a portion of a virtual address and in some cases additional information such as context information (e.g., a virtual machine identifier, and an address space identifier, etc.) Such a cache is referred to herein as a 'virtual-address cache' or 'VA cache'. Examples of a VA cache include caches that are accessed using an index and a tag, where the index is a portion of a virtual address and the tag is either another portion of the virtual address (in a virtually indexed, virtually tagged (VIVT) cache) or a portion of a corresponding physical address (in a virtually indexed, physically tagged (VIPT) cache). A VIVT cache is sometimes called a 'virtual cache'. One issue that may arise with VA caches the presence of 'synonyms', which are different virtual addresses that are mapped, by different respective translations, to the same physical address (also called 'aliasing'). There may be two or more different virtual addresses that all map to a common physical address, and are therefore synonyms of each other, or members of the same set of synonym virtual addresses. A cache that is allowed to store multiple synonym virtual addresses is potentially vulnerable to coherence violations unless certain precautions are taken.

SUMMARY

In one aspect, in general, a method includes: retrieving memory pages from a main memory based on virtual addresses translated to physical addresses; and storing, in one or more cache modules, copies of memory blocks from memory pages stored in the main memory. The one or more cache modules include a virtual-address cache module that, during an operating period, receives at least a portion of a virtual address and in response indicates a hit if a corresponding virtual address is presently stored in the virtual-address cache module, and indicates a miss if a corresponding virtual address is not presently stored in the virtual-address cache module. The virtual-address cache module includes: a first cache structure that stores only memory blocks with virtual addresses that are members of a set of multiple synonym virtual addresses that have all been previously received by the virtual-address cache module during the operating period, where each member of a particular set of multiple synonym virtual addresses translates to a common physical address, and a memory block with the common physical address is stored in at most a single storage location within the first cache structure; and a second cache structure that stores only memory blocks with virtual addresses that do not have any synonym virtual addresses that have been previously received by the virtual-address cache during the operating period.

In another aspect, in general, an apparatus includes: memory management circuitry configured to retrieve memory pages from a main memory based on virtual addresses translated to physical addresses; and a memory system including one or more cache modules that store copies of memory blocks from memory pages stored in the main memory. The one or more cache modules include a virtual-address cache module that, during an operating period, receives at least a portion of a virtual address and in response indicates a hit if a corresponding virtual address is presently stored in the virtual-address cache module, and indicates a miss if a corresponding virtual address is not presently stored in the virtual-address cache module. The virtual-address cache module includes: a first cache structure that stores only memory blocks with virtual addresses that are members of a set of multiple synonym virtual addresses that have all been previously received by the virtual-address cache module during the operating period, where each member of a particular set of multiple synonym virtual addresses translates to a common physical address, and a memory block with the common physical address is stored in at most a single storage location within the first cache structure; and a second cache structure that stores only memory blocks with virtual addresses that do not have any synonym virtual addresses that have been previously received by the virtual-address cache during the operating period.

Aspects can include one or more of the following features.

The virtual-address cache module is configured to receive at least a portion of a virtual address and in response indicate a hit if a corresponding virtual address is presently stored in the virtual-address cache module without requiring translation of the virtual address to a physical address before searching the first or second cache structures.

The virtual-address cache module is configured to receive at least a portion of a virtual address and in response indicate a hit if a corresponding virtual address is presently stored in the virtual-address cache module without requiring translation of the virtual address to any potential synonym virtual address before searching the first or second cache structures.

The virtual-address cache module is configured to receive at least a portion of a virtual address and in response indicate a hit if a corresponding virtual address is presently stored in the virtual-address cache module without requiring determination of whether or not the virtual address has any potential synonym virtual addresses before searching the first or second cache structures.

The first cache structure includes multiple entries each including: a set of bits for a virtual tag corresponding to a portion of a virtual address of a stored copy of a memory block, a set of bits for a physical tag corresponding to a portion of a physical address of the stored copy of the memory block.

The entries each include a set of bits for a storage location within the first cache structure of the stored copy of the memory block.

The second cache structure includes multiple entries each including: a set of bits for a virtual tag corresponding to a portion of a virtual address of a stored copy of a memory block, a set of bits for a physical tag corresponding to a portion of a physical address of the stored copy of the memory block, and a set of bits for the stored copy of the memory block.

The virtual-address cache module indicates a hit if a corresponding virtual address is presently stored in the virtual-address cache module, and indicates a miss if a corresponding virtual address is not presently stored in the virtual-address cache module, based at least in part on virtual tags in entries of the first cache structure and virtual tags in entries of the second cache structure.

After indicating a miss due to a corresponding virtual address not being presently stored in the virtual-address cache module, the virtual-address cache module indicates a hit if a corresponding physical address is presently stored in the virtual-address cache module, and indicates a miss if a corresponding physical address is not presently stored in the virtual-address cache module, based at least in part on physical tags in entries of the first cache structure and physical tags in entries of the second cache structure.

The entries each include a set of bits for one or more pointers to one or more members of the set of multiple synonym virtual addresses that have all been previously received by the virtual-address cache module during the operating period.

The one or more pointers each identify a cache set and a cache way, and the first cache structure is configured as a set associative cache with multiple cache sets and multiple cache ways.

Each synonym virtual address in the same set of multiple synonym virtual addresses that each translates to a common physical address is stored in a different entry in the first cache structure, and each of the different entries stores the same physical tag and the same storage location of the stored copy of the memory block having the common physical address.

The first cache structure includes multiple entries each corresponding to different members of sets of multiple synonym virtual addresses, and the virtual-address cache module has a limit on a maximum number of members of any particular set of multiple synonym virtual addresses that can be stored in entries of the first cache structure at the same time.

The virtual-address cache module is virtually tagged such that the virtual-address cache module determines whether to indicate a hit or a miss for a particular virtual address based on a tag that includes a portion of the particular virtual address and is compared with tags of multiple entries in at least one of the first or second cache structures.

The virtual-address cache module is virtually indexed such that the virtual-address cache module determines whether to indicate a hit or a miss for a particular virtual address based on an index that includes a portion of the particular virtual address and is used to look up one of multiple entries or sets of entries in the second cache structure.

The first cache structure has fewer entries than the second cache structure.

The first cache structure is configured as a fully associative cache.

The second cache structure is configured as a set associative cache with multiple cache sets and multiple cache ways.

A total number of entries in the first cache structure is at least as large as a total number of cache ways in the second cache structure.

The virtual-address cache module determines whether to indicate a hit or a miss for a particular virtual address based on: (1) a first comparison of a first tag including a portion of the particular virtual address with tags of multiple entries in the first cache structure, and (2) a first lookup of an index including a portion of the particular virtual address to select one of multiple cache sets in the second cache structure, and a second comparison of a second tag including a portion of the particular virtual address with tags of multiple entries in the selected cache set.

The first comparison and the first lookup are performed in parallel.

The first comparison and the second comparison are performed in parallel.

The first cache structure is configured as a set associative cache with multiple cache sets and multiple cache ways.

The virtual-address cache module restricts each member of a particular set of multiple synonym virtual addresses to be stored in the same particular cache set of the multiple cache sets, unless that member is the only member of that particular set of multiple synonym virtual addresses that is currently stored in the first cache structure.

The virtual-address cache module is configured as a first level data cache.

The one or more cache modules include one or more cache modules between the virtual-address cache module and the main memory, and at least some of the one or more cache modules between the first level data cache and the main memory are configured as a physical-address cache module that receives at least a portion of a physical address and in response indicates a hit if a copy of a corresponding memory block is presently stored in the physical-address cache module, and indicates a miss if a copy of the corresponding memory block not presently stored in the physical-address cache module.

Aspects can have one or more of the following advantages.

The use of VA caches, especially for low level caches such as an L1 data cache, lowers the cache hit latency, because a virtual-to-physical address translation can be avoided, at least for the initial indexing, and possibly avoided completely such as for a VIVT cache. But, the use of VA caches calls for management of synonyms. One technique for managing synonyms is to prevent multiple synonym virtual addresses to be stored in the cache at the same time. For example, software can be used to prevent the caching of synonyms, in which case the hardware does not need to manage synonyms. But, this solution may introduce a large software overhead. While caching at most one synonym of a set of multiple synonym virtual addresses avoids coherence problems, the ability to cache multiple synonym virtual addresses is useful for certain caching systems (e.g., 'memcached' systems) or for larger caches.

Different techniques for managing the caching of multiple synonym virtual addresses within a VA cache can be used. But, some solutions introduce overhead that impacts the cache hit latency. For example, one solution uses special hardware called a synonym lookaside buffer (SLB) to remap synonyms into a 'primary virtual address' that can then be stored in a cache. Other techniques for remapping virtual addresses to a unique virtual address can be used to functionally remove synonyms from a VA cache. However, such techniques still introduce overhead even in the case of a cache hit to perform such remapping. In some embodiments, the techniques described herein are able to manage the caching of multiple synonym virtual addresses without introducing significant overhead in the case of a cache hit, as described in more detail below.

Other features and advantages of the invention will become apparent from the following description, and from the claims.

DESCRIPTION

Figure 1:
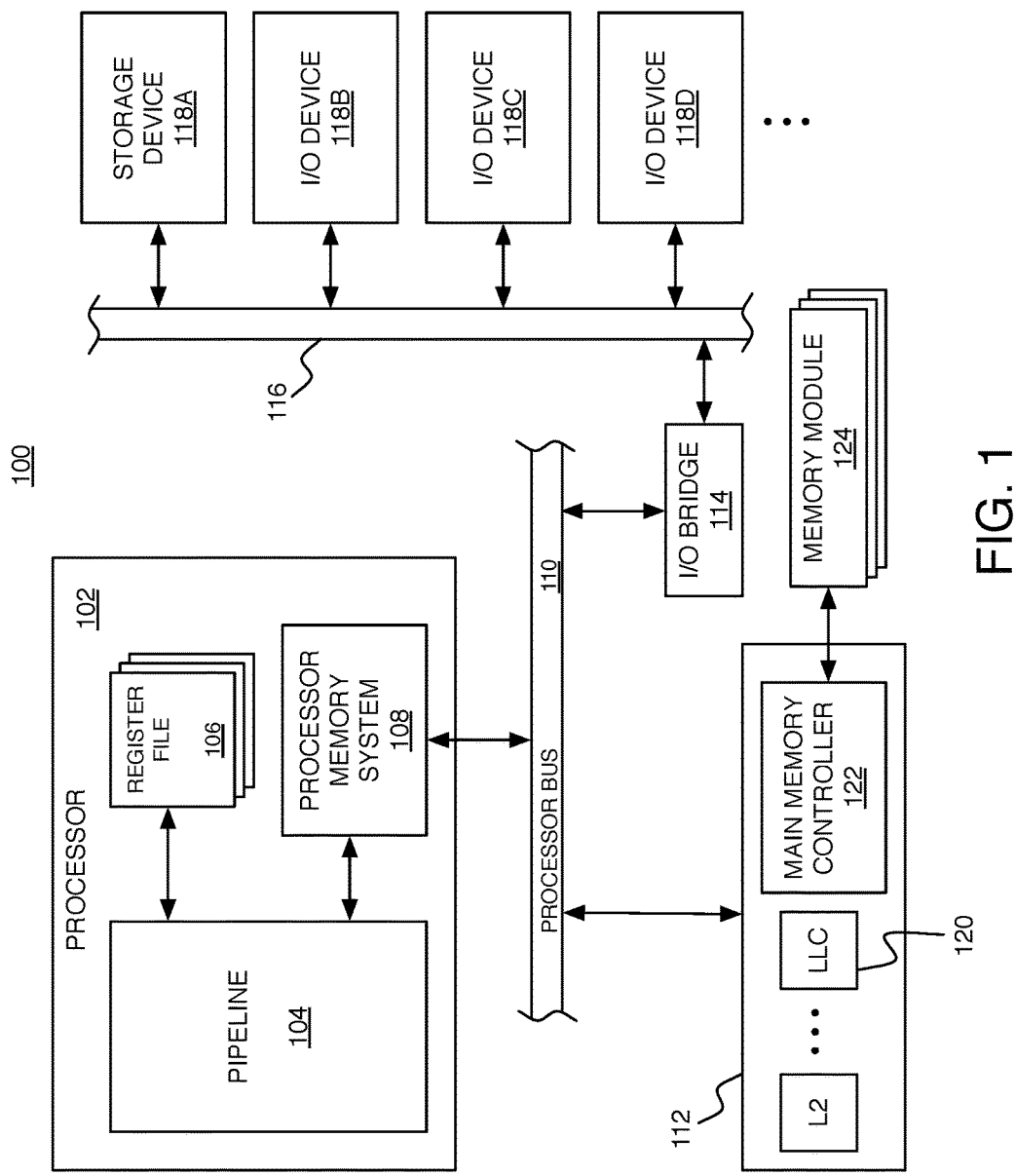
FIG. 1 is a schematic diagram of a computing system.

FIG. 1 shows an example of a computing system 100 in which the synonym management techniques can be used. The system 100 includes at least one processor 102, which could be a single central processing unit (CPU) or one of multiple processor cores of a multi-core architecture. In this example, the processor 102 includes a pipeline 104, one or more register files 106, and a processor memory system 108. The processor 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor 102, and the L3 (and higher) caches could be external to the processor 102. If the processor 102 is a multi-core processor, each core could have its own internal L1 cache, and the cores could share an L2 cache. The external memory system 112 also includes a main memory controller 122, which is connected to any number of memory modules 124 serving as main memory (e.g., Dynamic Random Access Memory modules).

In a particular cache module of any level of the hierarchy, each cache entry includes space for storing the data words of a particular memory block along with bits for a 'tag' (which contains a number of the most significant bits of an address, which are common to the words of that entry) and space for other information (e.g., a valid bit and any flags or error correction code bits). For a set associative cache, in addition to comparing a tag portion of a memory address of desired data, the cache system compares an 'index' portion of the address to determine in which of multiple sets the memory block containing that data may be stored. For an N-way set associative cache, the tag comparison is performed N times (possibly in parallel), once for each of N 'ways' in which the memory block containing the data may be stored. The lowest order bits of an address (also called a 'block offset') are used to select a particular word from a memory block that is found in the cache (i.e., a 'cache hit'). The index typically consists of the bits of an address between the tag bits and the block offset bits. If the memory block is not found in the cache (i.e., a 'cache miss'), then the cache system attempts to retrieve the memory block from a higher level cache, or from the main memory (in the case of the LLC). In a VA cache module, the index, the tag, or both are taken from the virtual address of a memory block being cached. In some systems, the lower level cache module (e.g., L1) is a VA cache module, but higher level cache modules are not VA cache modules.

Figure 2:
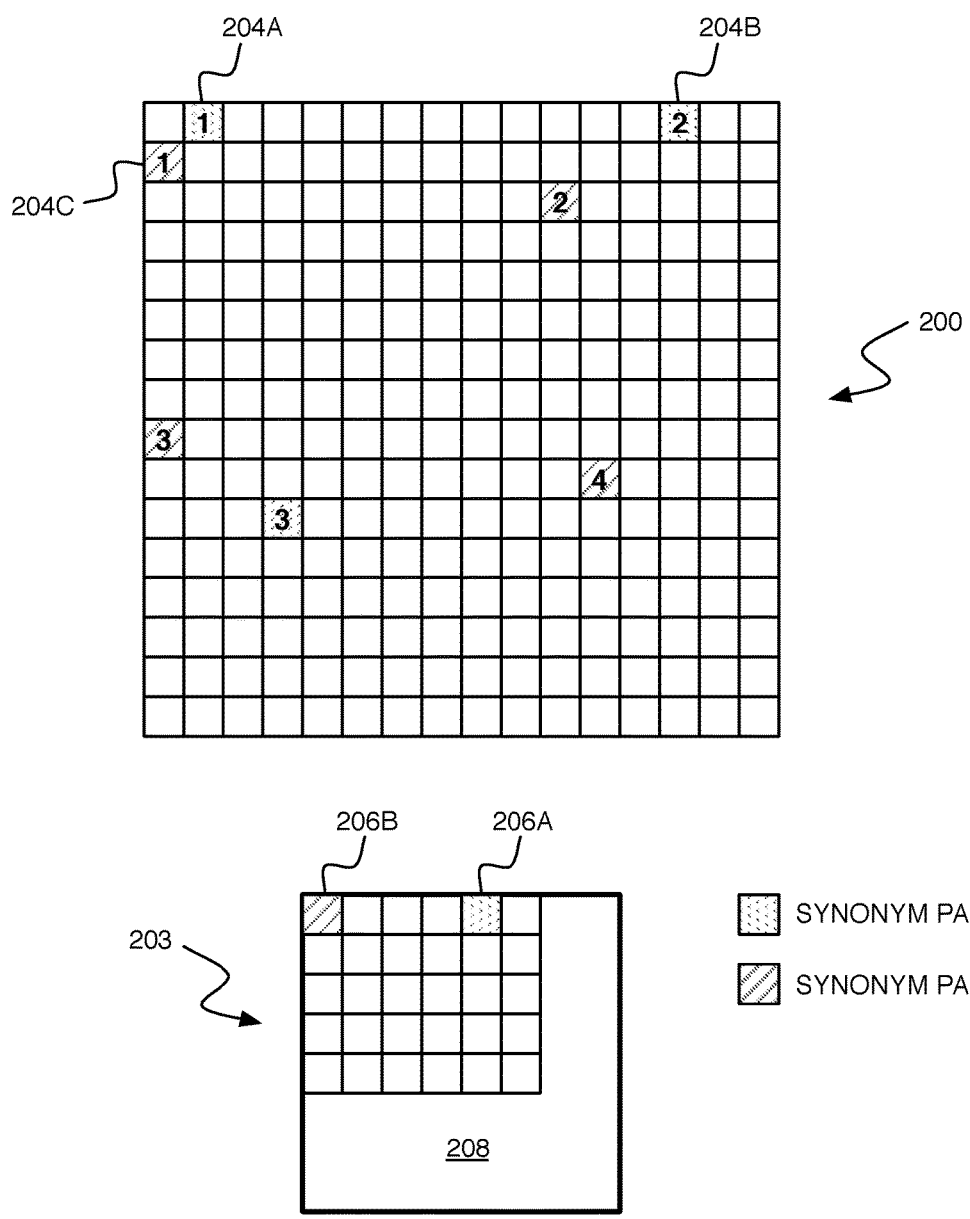
FIG. 2 is a schematic diagram illustrating the storage and caching of various sets of synonym virtual addresses.

FIG. 2 illustrates virtual addresses within a virtual address space 200, and the existence of sets of synonym virtual addresses that translate to common physical addresses within a physical address space 203. The size of the physical address space 203 is limited by the size of main memory. But, the size of the virtual address space 200 is limited only by the size of the secondary storage. (Relative sizes of these spaces in this example are only for illustration purposes, and are not necessarily to scale.) The physical address space 203 fills with data as virtual pages within the virtual address space 200 get translated to particular physical page numbers within the physical address space 203. Since not every physical page number within the physical address space 203 is necessarily mapped to a corresponding virtual page number, there may be unused space 208 within the physical address space 203.

Inevitably, a particular physical address may be re-translated, sequentially, to store data from different virtual addresses over the course of operation. However, a synonym occurs when different virtual addresses are translated, concurrently, to the same physical address, which may occur for various reasons. In this example, a first set of synonym pages 201 includes multiple virtual pages, where respective virtual addresses within different virtual pages translate to a common physical address within a common physical page; and a second set of synonym pages 202 includes multiple virtual pages where respective virtual addresses within different virtual pages translate to a common physical address within a common physical page. In this example, there are a total of three virtual pages (labeled 1, 2, 3) in synonym pages 201 that all translate to the same physical page 206A, and a total of four virtual pages (labeled 1, 2, 3, 4) in synonym pages 202 that all translate to the same physical page 206B.

Even though the caching of data within the physical address space 203 operates on a smaller granularity of memory blocks, it is the page numbers that distinguish different synonym virtual addresses. For example, a virtual address VA1 within a virtual page 204A and a virtual address VA2 within a virtual page 204B both translate to a common physical address PA within a physical page 206A. But, since virtual address-to-physical address translations operate on a granularity of memory pages, both of these virtual addresses VA1 and VA2 have the same page offset as the common physical address PA, and are therefore distinguishable by their page numbers. So, the relevant information is that the virtual page number of virtual page 204A and the virtual page number of virtual page 204B both translate to the same physical page number of physical page 206A. This makes the virtual address of each memory block within virtual page 204A a synonym of the virtual address of a corresponding memory block (with the same page offset) within virtual page 204B. The same holds true for each of these synonyms with respect to a corresponding memory block in the third virtual page of synonym pages 201.

If only a single virtual address of a set of multiple synonym virtual addresses from a set of synonym pages has been received by a VA cache module during its operating period (e.g., a period between flushes of the entire cache module), then there is no danger of cache coherence violations. For example, if a virtual address of a memory block at a particular page offset within the virtual page 204C has been received by the VA cache module, but no other virtual addresses with that particular page offset in any of the other three pages in the same set of synonym pages 202 have been received during the same operating period, then there is no possibility for different cache entries to be in conflict.

However, a potential for cache coherence violations occurs when multiple synonym virtual addresses that translate to a common physical address are cached in separate entries within the VA cache module during its operating period. For example, if the virtual address VA1 is received first, a first entry in the cache would store the data from physical address PA associated with that virtual address VA1. Then, if the virtual address VA2 is received at a later time, a second entry in the cache would store the same data from physical address PA associated with that virtual address VA2. If such separate entries are allowed, and at a later time the content of the VA1 entry is updated in a write operation but the content of the VA2 entry is not updated (and is not invalidated), there could be a cache coherence violation. For example a later read operation of VA2 should return the updated value that was written to the VA1 entry, but would not if it is read from the VA2 entry that was not updated.

Figure 3:
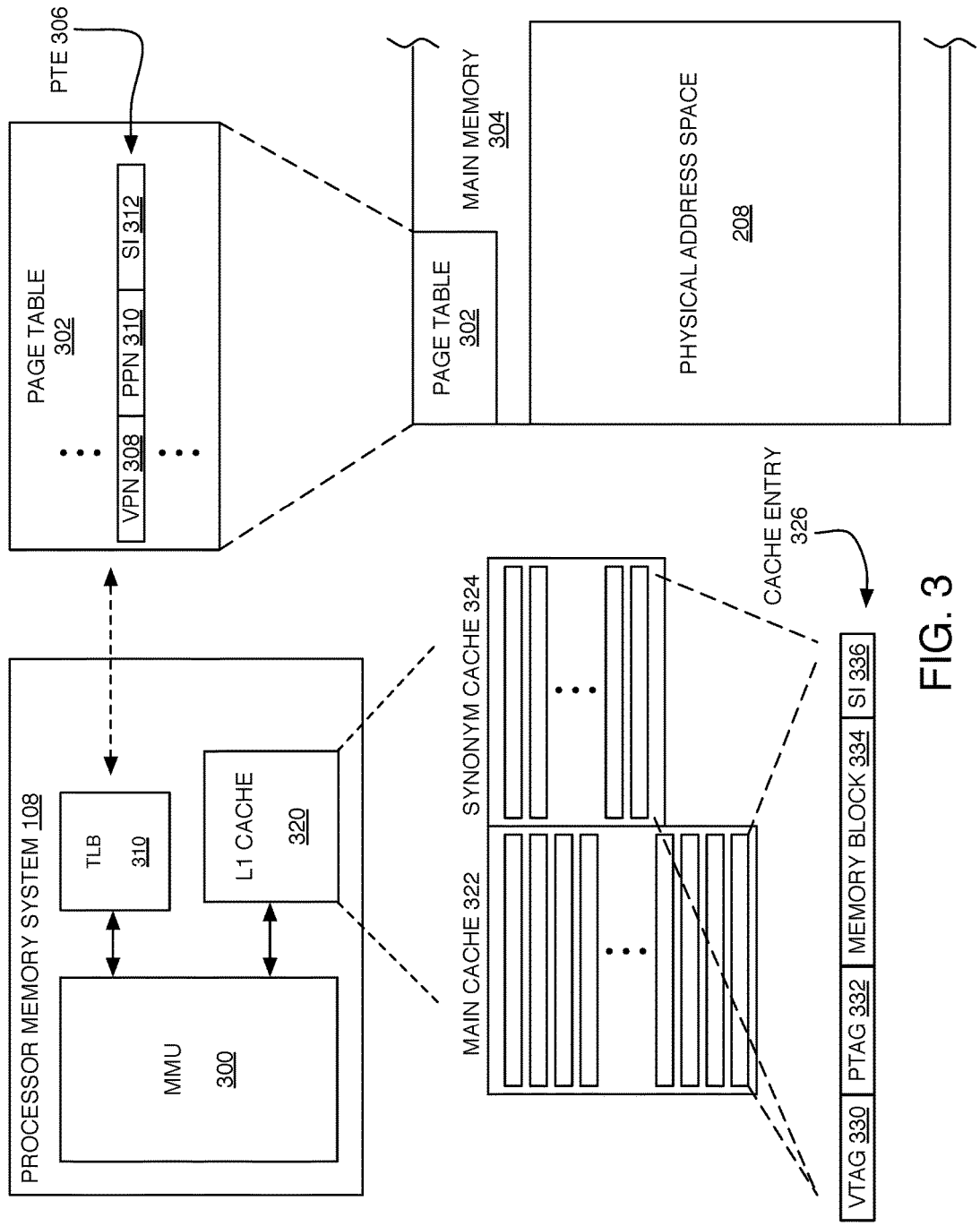
FIG. 3 is a schematic diagram illustrating an example of an architecture for managing synonyms.

FIG. 3 illustrates an example of a processor memory system 108 that is configured to avoid such cache coherence violations without sacrificing cache hit latency. The processor memory system 108 includes a memory management unit (MMU) 300 used for translation of virtual addresses to physical addresses. A page table 302, which is typically stored in main memory 304, stores the translations (also called 'mappings') between virtual addresses and physical addresses, at the granularity of memory pages. In this example, a page table entry (PTE) 306 of the page table 302 includes a virtual page number 308 and a physical page number 310, which define the translation along with any other information that may be necessary, such as context information defining the virtual address space within which the virtual page number is defined. The PTE 306 also includes status information 312, such as information indicating whether or not the page is resident in main memory 304 or needs to be retrieved from secondary storage (e.g., storage device 118A). As described above, for synonym pages, there would be different PTEs storing different virtual page numbers but the same physical page number.

The processor memory system 108 also includes a translation lookaside buffer (TLB) 310 for caching frequently used page table entries from the page table 302. This enables the translation to be performed without necessarily having to access main memory 304 to retrieve a page table entry. When a PTE 306 is stored in the TLB 310, there may also be additional information for managing the transfer of PTEs between a full page table 302 and the TLB 310. The processor memory system 108 also includes an L1 cache 320, and various other circuitry for handling a miss in either the TLB 310 or the L1 cache 320.

The L1 cache 320 is a VA cache module (e.g., a VIVT cache) that is able to use just a virtual address to determine whether there is a 'virtual address hit' CVA hit') or a 'virtual address miss' CVA miss'). When a load or store instruction is executed to load or store a data word associated with a particular virtual address, in the case of a VA hit, the L1 cache 320 is able to provide a word within a cached memory block for a load instruction, or to receive a word within a cached memory block for a store instruction. So, in this example, the TLB 310 is only used to translate a virtual memory address in the case of a VA miss. Because the L1 cache 320 is configured to cache multiple synonyms, it is possible that the data word associated with a particular virtual address is stored in a memory block of a cache entry even in the event of a VA miss. Specifically, the processor memory system 108 determines if there is a 'physical address hit' CPA hit') or a 'physical address miss' CPA miss') after a VA miss in order to determine if there is a 'cache hit' or 'cache miss' in the L1 cache 320, as described in more detail below. But, to ensure the caching of multiple synonyms do not cause cache coherency violations, the L1 cache 320 includes separate cache structures that are searched in a particular manner, as described in more detail below, before any of the higher levels of the cache hierarchy (e.g., in the external memory system 112) or the main memory 304 need to be accessed after the L1 cache 320.

The L1 cache 320 is configured to include a separate main cache structure 322 and synonym cache structure 324. The main cache structure 322 stores only memory blocks with virtual addresses that do not have any synonym virtual addresses that have been previously received by the L1 cache 320 during an operating period (e.g., a time since the last flush). So, if any virtual addresses result in a VA hit in the main cache structure 322, they should either not have any synonyms, or should only have synonyms that have not previously been received within the operating period (i.e., the sole synonym that has been received so far). The synonym cache structure 324 stores only memory blocks with virtual addresses that are members of a set of multiple synonym virtual addresses that have all been previously received by the L1 cache 320 during the operating period. So, if any virtual addresses result in a VA hit in the synonym cache structure 324, they should have at least one other synonym that has been received within the operating period (i.e., only groups of multiple synonyms). Each member of these groups of multiple synonyms would have its own entry in the synonym cache structure 324, but these entries would not necessarily all store copies of the memory block with the common physical address shared by these synonyms. For example, in some implementations, the synonym cache structure 324 is configured to store each group of synonyms in such a way that the memory block with the common physical address is stored one of the entries, and each of the other entry simply stores a pointer to that entry soring the actual memory block.

The synonym cache structure 324 can be configured to be significantly smaller than the main cache structure 322, since the number of active (i.e., frequently accessed) synonyms is typically not extremely large. In some implementations, the synonym cache structure 324 has a size of between 2 KB and 8 KB. The synonym cache structure 324 can also be optimized for an efficient content addressable memory (CAM) operation. On a hit in the synonym cache structure 324, an index is extracted and used to access a random access memory (RAM) array for read or write operations. In some implementations, the synonym cache structure 322 is configured as a fully associative cache, while the main cache structure 322 is configured as a set associative cache. In such implementations, the main cache structure 322 and the synonym cache structure 324 can be configured to have the same number of 'ways' (e.g., 32 ways), such that number of cache blocks in the fully associative synonym cache structure 322 is the same as in one set of the set associative main cache structure 322. In alternative implementations, the synonym cache structure 324 can be set associative, but configured so each synonym is stored in the same set. Or, the entries of the synonym cache structure 324 can include pointers to any other synonyms that are currently ached (i.e., that have all been previously received by the L1 cache 320 during the operating period). In the case of a set associative cache, the pointers can each identify a set and a way in which a synonym is stored.

When a virtual address received to check for an entry in the L1 cache 320, both the main cache structure 332 and the synonym cache structure 324 are searched for a corresponding entry. They can be searched serially in some implementations, or in parallel in other implementations. If they are searched serially, the main cache structure 332 can be searched before the synonym cache structure 324 to speed the case of a VA hit for a virtual address without any synonyms. Because, at any given time, any particular virtual address can only be in one of the main cache structure 322 or the synonym cache structure 324 but not both, there will be a VA hit in at most one of the structures. A cache entry 326 in either the main cache structure 322 or the synonym cache structure 324 includes a virtual tag 330 that is compared with a virtual tag being searched for (possibly within a set that has been indexed by a virtual index), a physical tag 332, a memory block 334, and optional status information 336. In the case of a VA hit, the memory block 334 can be accessed (e.g., read from or written to), and status information 336 can be checked before the access and/or updated after the access. For example, a VA hit may only correspond to an L1 cache hit if a valid bit is set. The physical tag 332 is compared with a physical tag being searched for, only in the case of a VA miss. After a VA miss, the virtual-to-physical address translation is performed and appropriate bits of that physical address are used as a physical tag that is compared to all the physical tags 332 stored in the L1 cache 320. If it is found, there is a PA hit, and if it is not found, there is a PA miss. Since the physical tag 332 is not accessed in the critical path of an L1 cache hit, the hit latency is not compromised (e.g., there may be a 3-cycle load-to-use latency for an L1 cache hit). Additionally, external invalidation requests coming from higher level cache modules in the external memory system 112 are able to use this physical tag 332 to invalidate entries storing cache blocks having particular physical addresses, if those higher level cache modules use physical addresses (e.g., a physically indexed, physically tagged (PIPT) cache).

For those cases in which there is a VA miss for one virtual address (e.g., VA1) but a PA hit for the corresponding physical address, that implies there must existed at least one synonym (e.g., VA2) in the L1 cache 320 (in the main cache structure 322 if it is the only cached synonym, or in the synonym cache structure 324 if it is one of multiple cached synonyms). Synonyms are installed in the synonym cache structure 324 after the first combination of a VA miss and a PA hit for a particular virtual address received within the operating period. Thereafter, any additional synonyms, up to a predetermined maximum number (e.g., 4) are allowed to be installed in the synonym cache structure 324. If the number of synonyms received exceed this maximum number, then one of the existing synonyms can be replaced (e.g., the least recently used synonym), and the new synonym can be installed.

The following table shows an example of rules that can be used to manage synonyms in the L1 cache 320 (or any other VA cache module that is configured in this manner). For each combination of hit/miss results (for VA hit/miss and, if necessary, PA hit miss) in the main cache structure 322 and the synonym cache structure 324, there is a set of resulting actions performed to manage the L1 cache 320. Additionally, actions would also be performed to perform any read or write operations for any load or store instructions being executed, in addition to these synonym management actions. The combinations of VA hit/miss and PA hit miss results are limited based on the structure of the L1 cache 320. For example, there cannot be a VA hit in both the main cache structure 322 and the synonym cache structure 324 at the same time, there cannot be a PA hit in both the main cache structure 322 and the synonym cache structure 324 at the same time, and the same memory block cannot be stored in entries of both the main cache structure 322 and the synonym cache structure 324 at the same time.

| main cache (MC) hit/miss | synonym cache (SC) hit/miss | synonym management actions |
| --- | --- | --- |
| VA miss, PA miss | VA miss, PA miss | A new entry with VA, PA, and memory block is installed in the MC. |
| VA miss, PA hit | VA miss, PA miss | The found entry in the MC is invalidated, and two entries are installed in the SC (searched VA, and VA corresponding to PA hit). |
| VA miss, PA miss | VA miss, PA hit | The new synonym is installed in the SC, or if maximum was reached, one of the synonyms is invalidated and replaced with the new synonym. |
| VA hit | VA miss | No synonym management needed. |
| VA miss | VA hit | No synonym management needed. |

Other embodiments may fall within the scope of the following claims, which do not necessarily include all of the features or advantages of the embodiments described above.

What is claimed is:

1. A method comprising:
 retrieving memory pages from a main memory based on virtual addresses translated to physical addresses; and
 storing, in one or more cache modules, copies of memory blocks from memory pages stored in the main memory;
 wherein the one or more cache modules include a virtual-address cache module that, during an operating period, receives at least a portion of a virtual address and in response indicates a hit if a corresponding virtual address is presently stored in the virtual-address cache module, and indicates a miss if a corresponding virtual address is not presently stored in the virtual-address cache module, wherein the virtual-address cache module includes:

a first cache structure that stores only memory blocks with virtual addresses that are members of a set of multiple synonym virtual addresses that have all been previously received by the virtual-address cache module during the operating period, where each member of a particular set of multiple synonym virtual addresses translates to a common physical address, and a memory block with the common physical address is stored in at most a single storage location within the first cache structure; and a second cache structure that stores only memory blocks with virtual addresses that do not have any synonym virtual addresses that have been previously received by the virtual-address cache during the operating period.

2. The method of claim 1, wherein the virtual-address cache module is configured to receive at least a portion of a virtual address and in response indicate a hit if a corresponding virtual address is presently stored in the virtual-address cache module without requiring translation of the virtual address to a physical address before searching the first or second cache structures.

3. The method of claim 1, wherein the virtual-address cache module is configured to receive at least a portion of a virtual address and in response indicate a hit if a corresponding virtual address is presently stored in the virtual-address cache module without requiring translation of the virtual address to any potential synonym virtual address before searching the first or second cache structures.

4. The method of claim 1, wherein the virtual-address cache module is configured to receive at least a portion of a virtual address and in response indicate a hit if a corresponding virtual address is presently stored in the virtual-address cache module without requiring determination of whether or not the virtual address has any potential synonym virtual addresses before searching the first or second cache structures.

5. The method of claim 1, wherein the first cache structure includes multiple entries each including: a set of bits for a virtual tag corresponding to a portion of a virtual address of a stored copy of a memory block, a set of bits for a physical tag corresponding to a portion of a physical address of the stored copy of the memory block.

6. The method of claim 5, wherein the entries each include a set of bits for a storage location within the first cache structure of the stored copy of the memory block.

7. The method of claim 5, wherein the second cache structure includes multiple entries each including: a set of bits for a virtual tag corresponding to a portion of a virtual address of a stored copy of a memory block, a set of bits for a physical tag corresponding to a portion of a physical address of the stored copy of the memory block, and a set of bits for the stored copy of the memory block.

8. The method of claim 7, wherein the virtual-address cache module indicates a hit if a corresponding virtual address is presently stored in the virtual-address cache module, and indicates a miss if a corresponding virtual address is not presently stored in the virtual-address cache module, based at least in part on virtual tags in entries of the first cache structure and virtual tags in entries of the second cache structure.

9. The method of claim 8, wherein after indicating a miss due to a corresponding virtual address not being presently stored in the virtual-address cache module, the virtual-address cache module indicates a hit if a corresponding physical address is presently stored in the virtual-address cache module, and indicates a miss if a corresponding physical address is not presently stored in the virtual-address cache module, based at least in part on physical tags in entries of the first cache structure and physical tags in entries of the second cache structure.

10. The method of claim 1, wherein the virtual-address cache module is virtually tagged such that the virtual-address cache module determines whether to indicate a hit or a miss for a particular virtual address based on a tag that includes a portion of the particular virtual address and is compared with tags of multiple entries in at least one of the first or second cache structures.

11. The method of claim 10, wherein the virtual-address cache module is virtually indexed such that the virtual-address cache module determines whether to indicate a hit or a miss for a particular virtual address based on an index that includes a portion of the particular virtual address and is used to look up one of multiple entries or sets of entries in the second cache structure.

12. The method of claim 1, wherein the first cache structure is configured as a fully associative cache.

13. The method of claim 12, wherein the second cache structure is configured as a set associative cache with multiple cache sets and multiple cache ways.

14. The method of claim 13, wherein the virtual-address cache module determines whether to indicate a hit or a miss for a particular virtual address based on: (1) a first comparison of a first tag including a portion of the particular virtual address with tags of multiple entries in the first cache structure, and (2) a first lookup of an index including a portion of the particular virtual address to select one of multiple cache sets in the second cache structure, and a second comparison of a second tag including a portion of the particular virtual address with tags of multiple entries in the selected cache set.

15. The method of claim 14, wherein the first comparison and the first lookup are performed in parallel.

16. The method of claim 14, wherein the first comparison and the second comparison are performed in parallel.

17. The method of claim 1, wherein the first cache structure is configured as a set associative cache with multiple cache sets and multiple cache ways.

18. The method of claim 17, wherein the virtual-address cache module restricts each member of a particular set of multiple synonym virtual addresses to be stored in the same particular cache set of the multiple cache sets, unless that member is the only member of that particular set of multiple synonym virtual addresses that is currently stored in the first cache structure.

19. An apparatus comprising:

memory management circuitry configured to retrieve memory pages from a main memory based on virtual addresses translated to physical addresses; and a memory system including one or more cache modules that store copies of memory blocks from memory pages stored in the main memory;

wherein the one or more cache modules include a virtual-address cache module that, during an operating period, receives at least a portion of a virtual address and in response indicates a hit if a corresponding virtual address is presently stored in the virtual-address cache module, and indicates a miss if a corresponding virtual address is not presently stored in the virtual-address cache module, wherein the virtual-address cache module includes:
- a first cache structure that stores only memory blocks with virtual addresses that are members of a set of multiple synonym virtual addresses that have all been previously received by the virtual-address cache module during the operating period, where each member of a particular set of multiple synonym virtual addresses translates to a common physical address, and a memory block with the common physical address is stored in at most a single storage location within the first cache structure; and
- a second cache structure that stores only memory blocks with virtual addresses that do not have any synonym virtual addresses that have been previously received by the virtual-address cache during the operating period.

20. The apparatus of claim 19, wherein the first cache structure includes multiple entries each including: a set of bits for a virtual tag corresponding to a portion of a virtual address of a stored copy of a memory block, a set of bits for a physical tag corresponding to a portion of a physical address of the stored copy of the memory block.

21. The apparatus of claim 20, wherein the entries each include a set of bits for a storage location within the first cache structure of the stored copy of the memory block.

22. The apparatus of claim 20, wherein the second cache structure includes multiple entries each including: a set of bits for a virtual tag corresponding to a portion of a virtual address of a stored copy of a memory block, a set of bits for a physical tag corresponding to a portion of a physical address of the stored copy of the memory block, and a set of bits for the stored copy of the memory block.

23. The apparatus of claim 20, wherein the entries each include a set of bits for one or more pointers to one or more members of the set of multiple synonym virtual addresses that have all been previously received by the virtual-address cache module during the operating period.

24. The apparatus of claim 23, wherein the one or more pointers each identify a cache set and a cache way, and the first cache structure is configured as a set associative cache with multiple cache sets and multiple cache ways.

25. The apparatus of claim 20, wherein each synonym virtual address in the same set of multiple synonym virtual addresses that each translates to a common physical address is stored in a different entry in the first cache structure, and each of the different entries stores the same physical tag and the same storage location of the stored copy of the memory block having the common physical address.

26. The apparatus of claim 19, wherein the first cache structure includes multiple entries each corresponding to different members of sets of multiple synonym virtual addresses, and the virtual-address cache module has a limit on a maximum number of members of any particular set of multiple synonym virtual addresses that can be stored in entries of the first cache structure at the same time.

27. The apparatus of claim 19, wherein the virtual-address cache module is virtually tagged such that the virtual-address cache module determines whether to indicate a hit or a miss for a particular virtual address based on a tag that includes a portion of the particular virtual address and is compared with tags of multiple entries in at least one of the first or second cache structures.

28. The apparatus of claim 27, wherein the virtual-address cache module is virtually indexed such that the virtual-address cache module determines whether to indicate a hit or a miss for a particular virtual address based on an index that includes a portion of the particular virtual address and is used to look up one of multiple entries or sets of entries in the second cache structure.

29. The apparatus of claim 19, wherein the first cache structure has fewer entries than the second cache structure.

30. The apparatus of claim 19, wherein the first cache structure is configured as a fully associative cache.

31. The apparatus of claim 30, wherein the second cache structure is configured as a set associative cache with multiple cache sets and multiple cache ways.

32. The apparatus of claim 31, wherein a total number of entries in the first cache structure is at least as large as a total number of cache ways in the second cache structure.

33. The apparatus of claim 19, wherein the first cache structure is configured as a set associative cache with multiple cache sets and multiple cache ways.

34. The apparatus of claim 33, wherein the virtual-address cache module restricts each member of a particular set of multiple synonym virtual addresses to be stored in the same particular cache set of the multiple cache sets, unless that member is the only member of that particular set of multiple synonym virtual addresses that is currently stored in the first cache structure.

35. The apparatus of claim 19, wherein the virtual-address cache module is configured as a first level data cache.

36. The apparatus of claim 35, wherein the one or more cache modules include one or more cache modules between the virtual-address cache module and the main memory, and at least some of the one or more cache modules between the first level data cache and the main memory are configured as a physical-address cache module that receives at least a portion of a physical address and in response indicates a hit if a copy of a corresponding memory block is presently stored in the physical-address cache module, and indicates a miss if a copy of the corresponding memory block not presently stored in the physical-address cache module.

* * * * *